United States Patent [19]

Hutchings

[11] Patent Number: 5,049,804
[45] Date of Patent: Sep. 17, 1991

[54] UNIVERSAL BATTERY CHARGING SYSTEM AND A METHOD

[75] Inventor: Phillip D. Hutchings, Wiltshire, United Kingdom

[73] Assignee: Power-Tech Systems Corporation, Kent, Conn.

[21] Appl. No.: 154,292

[22] Filed: Feb. 10, 1988

Related U.S. Application Data

[62] Division of Ser. No. 55,795, Jun. 1, 1987, Pat. No. 4,843,299.

[51] Int. Cl.$^5$ .................................. H02J 7/00
[52] U.S. Cl. ............................ 320/20; 320/23; 320/31; 320/39
[58] Field of Search ......................... 320/20-24, 320/31, 32, 39

[56] References Cited

U.S. PATENT DOCUMENTS

| | | | |
|---|---|---|---|
| 2,285,620 | 6/1942 | Sears | 320/31 X |
| 3,217,225 | 11/1965 | Gottlieb et al. | 320/31 X |
| 3,576,487 | 4/1971 | Chase | 320/31 X |
| 3,652,916 | 3/1972 | Ballman | 320/40 X |
| 3,688,177 | 8/1972 | Reeves et al. | 320/24 |
| 3,854,082 | 12/1974 | Masby et al. | 320/24 X |
| 4,061,956 | 12/1977 | Brown et al. | 320/23 X |
| 4,270,080 | 5/1981 | Kostecki | 320/24 |
| 4,609,861 | 9/1986 | Inaniwa et al. | 320/39 X |
| 4,670,703 | 6/1987 | Williams | 320/31 X |
| 4,710,694 | 12/1987 | Sutphin et al. | 320/24 X |

FOREIGN PATENT DOCUMENTS 515191  6/1976  U.S.S.R. ............................ 320/23

Primary Examiner—R. J. Hickey
Attorney, Agent, or Firm—Rogers & Killeen

[57] ABSTRACT

A universal battery charger and recharger for electric batteries having different charging characteristics. The battery charger includes a microprocessor receiving inputs from current, voltage and temperature sensors for controlling the battery charging profile. A replaceable memory may be included to provide an appropriate charging profile for the battery to be charged. The supply current is varied responsively to the voltage across the battery which is measured when the supply current reaches a predetermined level or after a predetermined time.

8 Claims, 6 Drawing Sheets

UNIVERSAL BATTERY CHARGING SYSTEM AND A METHOD

CROSS-REFERENCES TO RELATED APPLICATIONS

This application is a Division of U.S. patent application Ser. No. 07/055,795, filed June 1, 1987, now U.S. Pat. No. 4,843,299, issued June 27, 1989.

BACKGROUND OF THE INVENTION

This invention relates to devices for charging or recharging electric batteries and particularly a universal battery recharger for batteries having different charging characteristics.

Electric batteries are utilized to provide mobility to a great number of devices powered by electric motors or which otherwise utilize electrically. In some such devices, such as automobiles, the device provides a recharging circuit to the battery so that the battery is kept at a full level of charge as long as the recharging circuit is operative. However, it is a frequent occurence that components of the device, such as the headlights of an automobile, are inadvertently left powered and when the charging circuit is not resupplying charging voltage. Consequently, the battery drains off most of its energy until it is recharged by an external circuit. Many other devices, such as golf carts, forklift vehicles, and numerous other portable devices are designed to draw their power from the battery without replacing the power by a charging circuit during the operation of the device. Typically, in such devices, the device is operated for a period of time and when the device is not in operation the battery is connected to an external source of power, such as a battery charger to recharge the battery. Consequently, there is a considerable need for battery charging devices to recharge batteries which either through design or inadvertance have become discharged.

It is known to provide battery charges which apply a potential voltage having a direct current across the battery terminals for a period of time. The cells of the battery absorb and store a portion of the energy provided thereby. Different types of batteries have different charging characteristics. Accordingly, a charging circuit which is designed for a particular type of battery may not function efficiently or at all as a recharger for a different type of battery or even for the same type of battery manufactured by different manufactures. Accordingly, it is known to develop a discrete circuit which provides a charging current to a battery in a charging profile which matches the battery specification.

A battery charging profile or characteristic preferably includes three or more phases during which varying amounts of current and/or voltage are supplied to the battery. One typical recharging sequence comprises a first phase in which a constant current is provided to the battery terminals until the battery voltage is brought up to the full rated level. Once the voltage has been brought up to level, a constant voltage or current may be provided to the battery for a period of time which is often related to the period of time which elapsed during the first phase, for example a period of time equal to twice the period of time taken to bring the voltage up to its rated level. Upon the completion of the second phase, a small current is applied across the battery terminals to maintain the charge at its maximum, this third phase is sometimes called a "trickle" charging phase.

The precise time, voltage, and current which should optimally be applied to a particular battery type to recharge it often varies from one battery type to another. However, many battery users do not wish to operate plural battery rechargers, one for each type of battery and operate a battery charger having a "typical" or "average" charging characteristics. However, such an "average" battery charger may not meet the desired charging characteristics of any of the batteries on which it is utilized.

Accordingly, it is an object of the present invention to provide a battery charging method and apparatus which can efficiently recharge many different types of batteries.

It is further object of the present invention to provide a battery charging method and apparatus in which different types of batteries may be recharged without the necessity of changing the components of the charger except for a charging characteristic memory.

It is yet a further object of the present invention to provide a battery charging method and apparatus for charging batteries having both low sulfation and high sulfation characteristics.

It is yet another object of the present invention to provide a novel battery charging method and apparatus which will charge batteries having charging characteristics which are currently unknown and unanticipated.

The invention will now be described in more detail by way of example with reference to the accompanying drawings in which:

DETAILED DESCRIPTION OF THE DRAWINGS

FIG. 1 is a pictorial representation of a battery charging system embodying the present invention;

FIGS. 4–7 are logic flow charts for a battery charging systems operating in accordance with various embodiments of the present invention.

DETAILED DESCRIPTION OF THE PREFERRED EMBODIMENT

Figure 6:
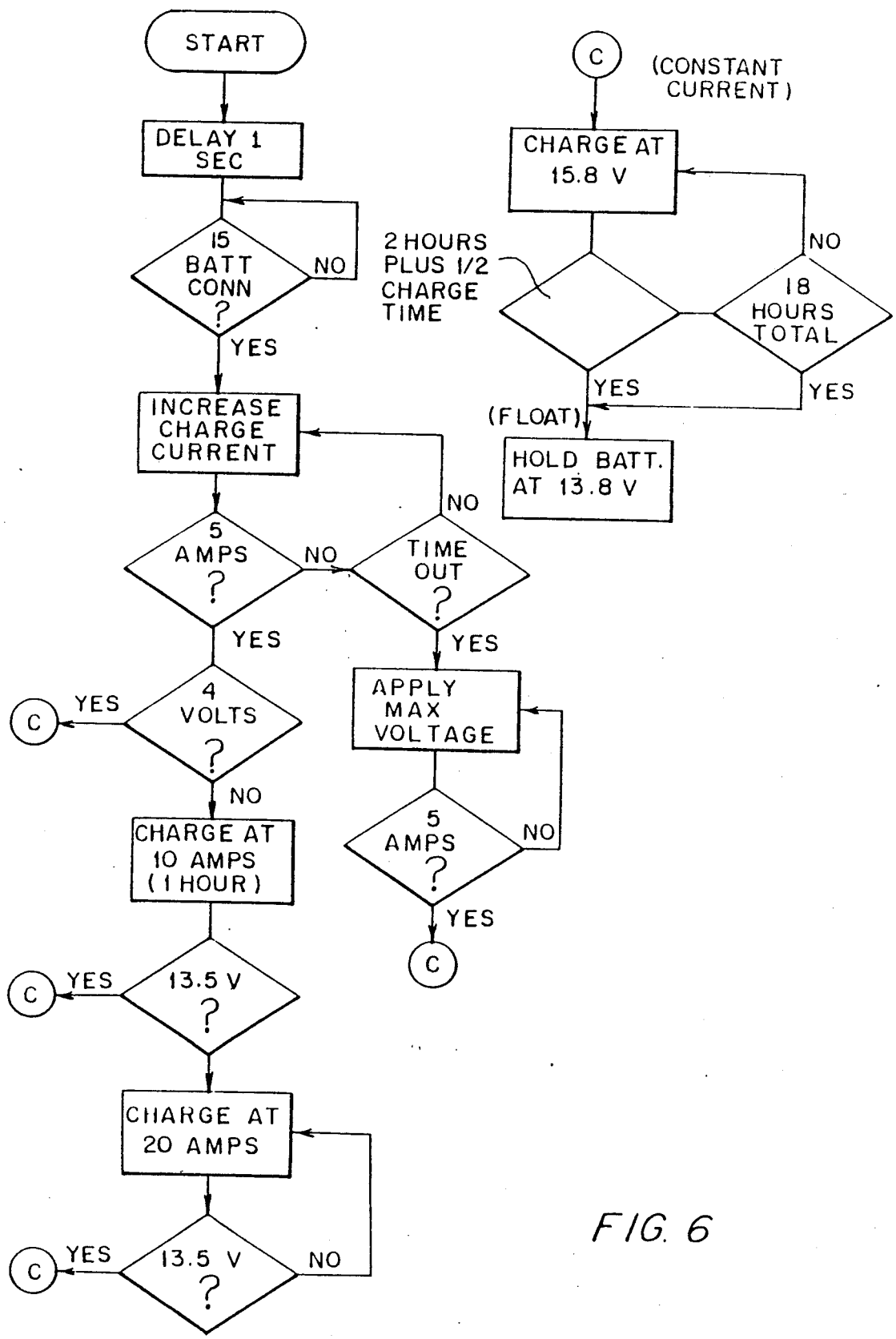

With reference to FIG. 1, a battery charging system of the present invention may be housed in a housing ten which protects the circuit from external elements such as water and dirt and which ensures that foreign objects, including the hands of the user, are not allowed in proximity of any high voltages which may be present within the battery charger circuit. A carrying strap 12 may be carried at the top of the housing ten to facilitate transportation of the battery charger circuit. Electrical power may provided to the battery charger system by a conventional electric plug 14. A charging voltage provided by the battery charger may be provided to a battery by means of electrical cables which terminate in spring loaded clamps 16a, 16b for connection to the terminals of the battery to be charged.

Appropriate vents 18 may be provided at various locations along the housing ten to provide ambiant air cooling of the printed circuit boards within the battery charger.

The front of the battery charger may include various indicating devices such as lamps 20a, 20b, and 20c which are controlled by the circuitry of the battery charger to indicate to the user the current charging condition of the battery charger. Additionally, an ammeter 22 and a voltmeter (not shown) may be provided to indicate to the user the current amount of amperage and voltage being supplied to the battery. The operation of the battery charger may be ultimately controlled by an on/off switch 24.

In operation, the battery charger is brought into physical proximity of a battery to be charged. The battery charger is powered by plugging the electrical plug 14 into an available socket supplying the appropriate electrical current, generally an alternating current of either 110 volt or 220 volt magnitude. The clamps 16a, 16b are coded to indicate which clamp is associated with the positive terminal of a battery and which is associated with the negative terminal and the clamps are placed on the terminals of the battery in accordance with their indicated polarity. The battery charger may then be started by operation of the switch 24 at which point the automatic circuits of the battery charger, explained below, provide the appropriate amounts of current and/or voltage to the battery to be recharged.

In a battery charger of the present invention, an access slate (not shown) may be provided at an appropriate location on the housing ten to facilitate the replacement of a charger characteristic memory, so that the charge may be readily configured to recharge different types of batteries.

Figure 2:
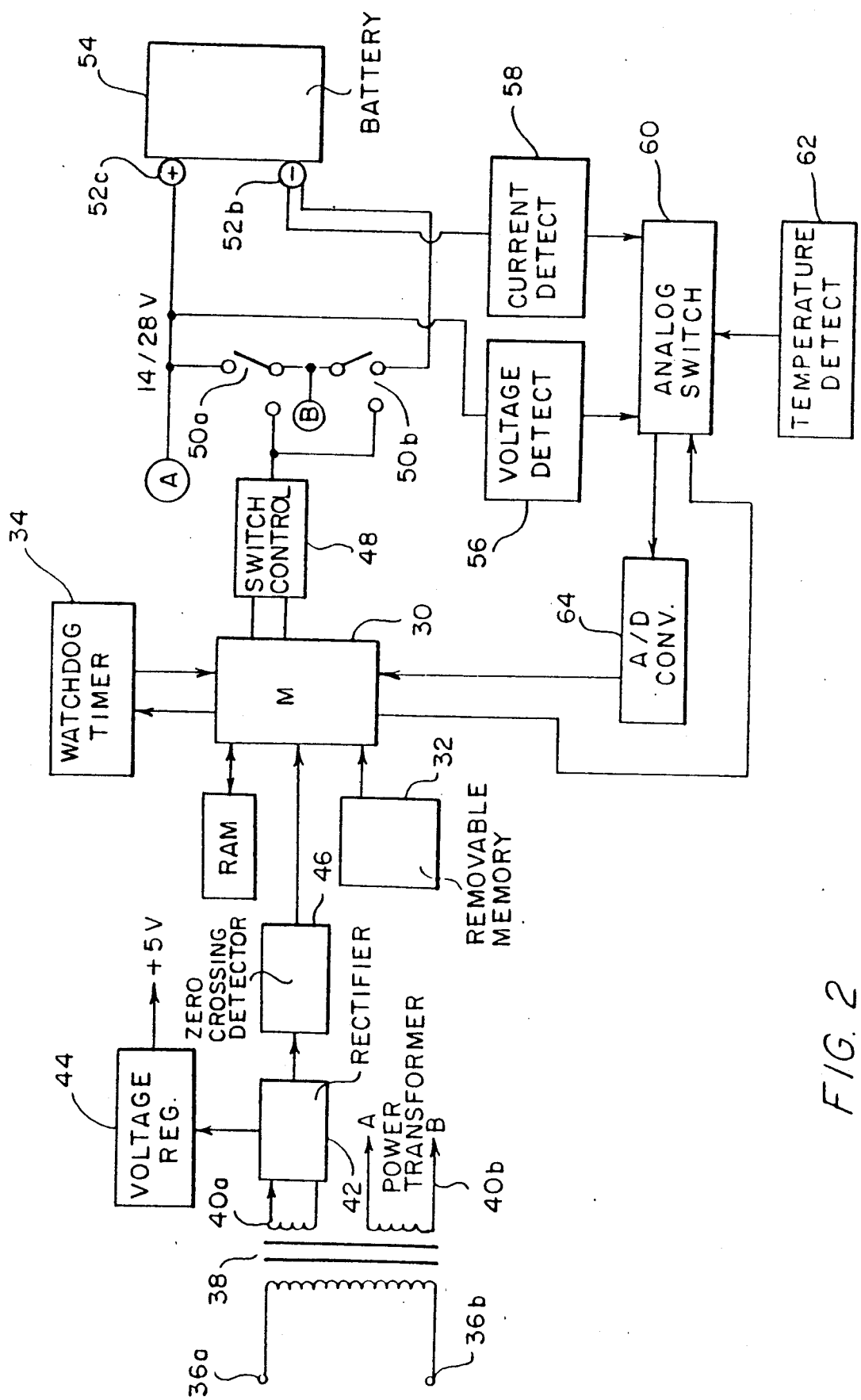
FIG. 2 is a block diagram of a battery charging system embodying the present invention.

With reference to FIG. 2, a battery charger of the present invention may be controlled by a micro-processor 30. The micro-processor 30 may include elements of read only or random access memory as desired and is well known. Additionally, the micro-processor 30 may communicate with a removable memory 32 which contains signals indicative of the charging characteristics of one or more types of batteries. The micro-processor may be further in communication with a watch-dog timer circuit 34.

Power may supplied to the battery charger circuit from a conventional alternating source to power input terminals 36a, 36b. Power obtained across the power input terminals 36a, 36b may be provided to a transformer 38 which has plural secondary windings 40a, 40b, each secondary winding obtaining a predetermined proportion of the voltage provided across the power input terminals 36a, 36b. Power to be provided to the logic circuits of the battery charger printed circuit board may be rectified through a rectifier 42 and regulated by a conventional voltage regulator 44. The electrical power rectified in rectifier 42 may also be provided to a zero crossing detector 46 which is in communication with the micro-processor 30.

The micro-processor is programmed to provide reset signals at certain predetermined minimum periods of time to the watch dog timer circuit 34. If the micro-processor 34 fails to provide such resetting signals within the predetermined period of time, the watch dog timer 34 may sound an alarm and/or reset the micro-processor 30. In this way, sanity of the operation of the micro-processor 30 is insured and the battery 54 being recharged is not overcharged.

The removable memory 32 contains logic tables and switch settings which instruct the micro-processor 30 on the changing characteristics of one or more types of batteries. By the use of a modular and tabular control method, the micro-processor 30 may contain a generalized series of instructions to implement its control functions in accordance with the specific tables/settings provided in the removeable memory 32. In this way a simple removeable memory 32 may control the entire battery charger circuit and provide for a series of recharging phases which is precisely tuned to the needs of battery being recharged.

Control of the charging of the battery is obtained through the switch control 48 and the micro-processor 30. Because the micro-processor 30 knows the phase of the power being provided to the battery through the switch 50b, the micro-processor 30 operates the switch control circuit 48 to operate the switches 50a and 50b in a desired manner in accordance with the phase of the power signal being supplied to the battery 54. For example, if full power is desired to be applied to the battery 54, the switches 50a and 50b could be continually closed. If, on the other hand, only a small amount of power were desired to be provided to the battery 54, the switches 50a, 50b could be opened at those phases of the power signal in which the voltage is high and closed (i.e., providing power to the battery) only when the voltage is low.

In comparison with other schemes of controlling the power to the battery to be charged, the present invention controls the switching of the power to the battery directly, and, thus, is able to vary to amount of power provided to the battery without the need for additional circuitry and over a wide range of conditions.

The voltage detect circuit 56, the current detect current 58 and the temperature detect circuit 52 determine the characteristics of the recharging performance which are supplied to an analog switch 60. The analog switch 60 is controlled by the micro-processor 30 and provides the analog signal received from either the voltage, current, or temperature detect circuits to the output terminal of the analog switch 60. The signal contained in output terminal of the analog switch 60 is available to the analog to digital converter 64 which in turn is supplied to the micro-processor 30. Thus the micro-processor 30 is able to change the charging characteristics supplied to the battery in accordance with detected voltage, detected current, temperature, time, history of any of the foregoing parameters, and all combinations thereof.

Figure 3:
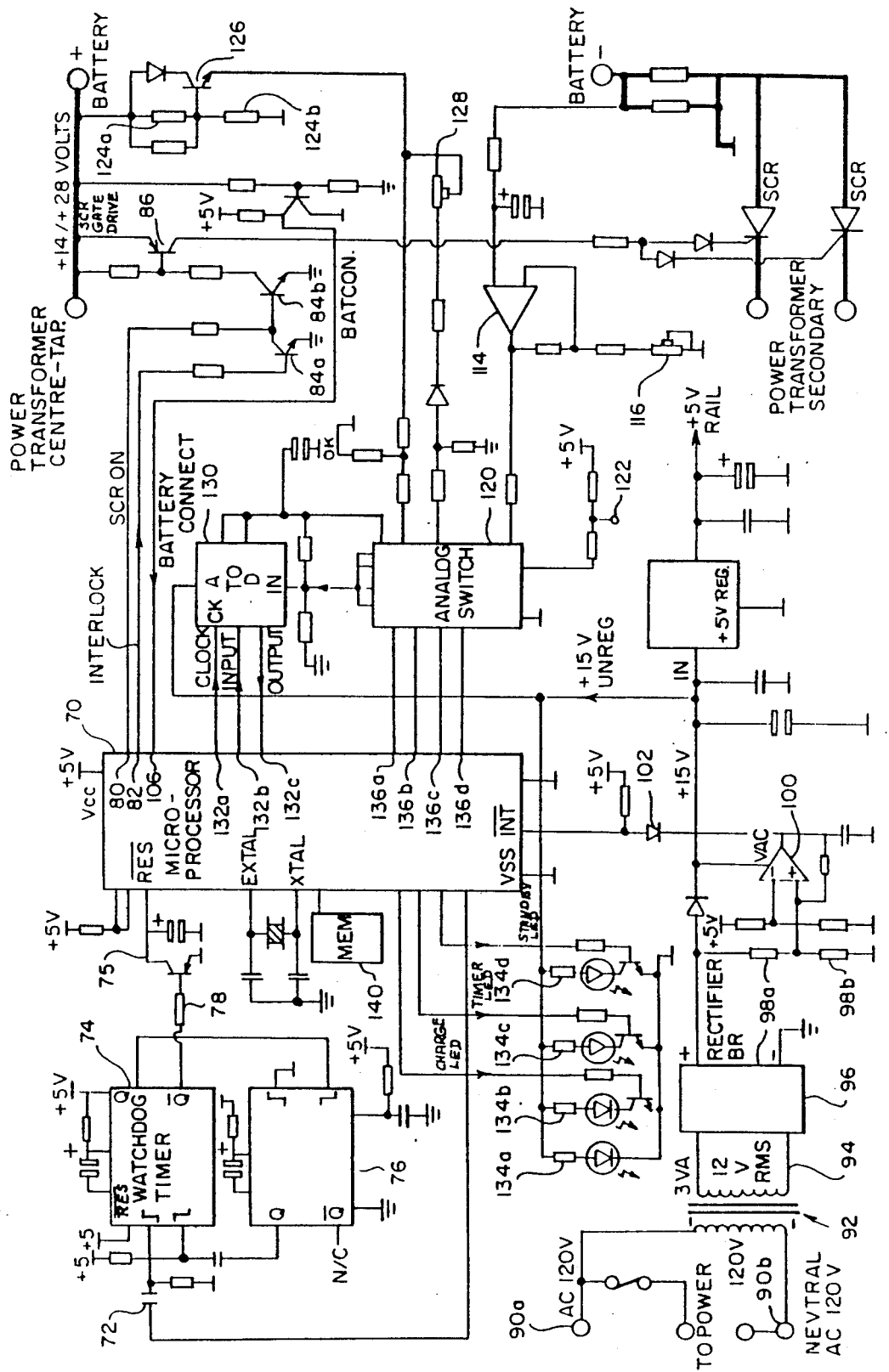
FIG. 3 is a circuit diagram of a micro-processor control circuit for the battery charger of FIG. 3.

With reference to FIG. 3, a battery charging circuit of the present invention may include a micro-processor 70. One of the outputs of the micro-processor 70 may be tied through a capacitor 72 to a CMOS dual retriggering monostable 74 which communicates with a second CMOS dual retriggering monostable 76 and with the reset lead of the micro-processor 70 through a drive transistor 76 and driver resister 78.

In operation, the micro-processor is programmed to provide a transitory signal on the output tied to the capacitor 72 on a regularly recurring basis. As long as the micro-processor is cycling correctly, the transitory signal is applied to the capacitor 72 and the first retriggering monostable provides a signal to the reset pin of the micro-processor to indicate that a reset is not needed. If the trajectory signal is not received at the capacitor 72 from the micro-processor 70, the first retriggering monostable no longer holds the reset signal and the micro-processor 70 is reset to begin processing from the start. In this manner, the recharger circuit board is assured that the micro-processor 70 is promptly cycling through its coding. The second retriggering monostable 76 is connected to the first monostable 74 so that the watch dog timer circuit can be powered up without continuing to reset the micro-processor 70.

The micro-processor 70 is electrically connected through two output ports 80 and 82 to transistors 84a, 84b. Transistors 84a, 84b drive an SCR gate which completes an electrical circuit to the positive and negative terminals 88a, 88b of the battery to be recharged.

In operation, when the output ports 80, 82 are energized the SCR drive gate is enabled and a recharging current is provided to the terminals of the battery 88a, 88b. Two ports are used to prevent the inadvertant application of the charging voltage to the battery terminals 88a, 88b as both ports have to be in the required states in order for the SCR drive gate to be energized.

Power to the battery charging circuit may be provided by standard household alternating current, typically 110 volts or 120 volts in the United States or 220/240 volts in other countries. The alternating current is supplied to the power input terminals 90a, 90b, applied across a transformer 92 and induced upon secondary windings 94. The current received at the secondary windings is applied to a rectifier bridge 96. The output of the rectifier bridge 96 is applied to a voltage divider consisting of two resistors 98a, 98b. The divided voltage is provided to one terminal of a comparator 100. The other terminal of the comparator 100 is connected to a low voltage of approximately the same voltage as the divided voltage. The output of the comparator 100 is connected through a diode 102 to the interrupt lead of the micro-processor 70. Thus, the micro-processor 70 is informed of the zero crossing of the power received at the input terminals 90a, 90b and available for application to the battery terminals 88a, 88b. The rectified voltage may be provided to a conventional voltage regulator 104 to provide a logic voltage to power the various logic boards on the battery charging circuit.

The precise time, voltage, and current which should optimumly be applied to a particular battery type to recharge it often varies from one battery type to another. However, many battery users do not wish to operate plural battery rechargers, one for each type of battery and operate a battery charger having a "typical" charging characteristic. However, such a battery charger may not meet the desired charging characteristics of any of the batteries on which it is utilized.

An amperage detection circuit measures amperage being supplied to the battery connected at the battery terminals 88a, 88b, by connecting one terminal of an op amp 114 to the negative terminal of the battery 88b and connecting the other terminal of the op amp 114 in a feedback loop which includes a calibrating resistor 116 for establishing the calibration point of the amperage detection circuit. The output of the op amp 114 is connected through a resistor 118 to one of the input terminals of an analog switch 120. Another of the input terminals of the analog switch 120 is connected to a thermistor for measurement of the ambiant temperature of the battery charger.

A voltage detection circuit may supply a measure of the voltage across the battery. For example, in the 24 volt system, the voltage can be divided by voltage divider network comprising of two resistors 124a, 124b. The base of a transistor 126 is being driven by the divided voltage. The output of the transistor 126 may be provided to the analog switch 120 after being calibrated by a calibrating resistor 128. The output of the analog switch 120 may be provided to an A-to-D converter 130 which is controller by the micro-processor 70 through A-D ports 132a, 132b, 132c. The first A-D port 132a may be used to provide a clock from the micro-processor 70 to the A-D converter 130. The second port 132b may be utilized to provide a signal indicating a reset condition to the A-D converter 130. The third A-D port may utilized to provide the output of the A-D converter 130 to the micro-processor 70.

The value which is provided to the A-D converter 130 by the analog switch 120 may be controlled by select leads 136a, 136b, 136c, 136d which communicate between the micro-processor 70 and the analog switch 120. The select leads are used to trigger the analog switch to provide the value of a specified input at the output terminal. The value is received from the thermistor, from the amperage detection circuit, from the voltage detection circuit upper range, or from the voltage detection circuit lower range.

The entire control of the micro-processor 70 may be effected through a movable memory 140 which can provide signals customizing the recharging circuit to the charging characteristics of any particular battery type. Because the memory 140 is removable, the circuit may be made to charge varying types of batteries by merely changing the memory element.

In operation, the battery charger circuit and in particular the micro-processor 70 can control the phase of the firing of the SCR gate drive 86 in correspondence with the phase of the recharging power made available to the recharging circuit. Because the micro-processor 70 is interrupted when the zero crossing of the recharging power is detected, the micro-processor 70 may control the phase of the firing of the SCR drive gate 86 to correspond to the proportion of the input power desired to be applied to the battery terminals 88a, 88b.

Status indicating 134a, 134b, 134c, 134d may be controlled by the micro-processor 70 to indicate the status of the recharging operation.

Figure 4:
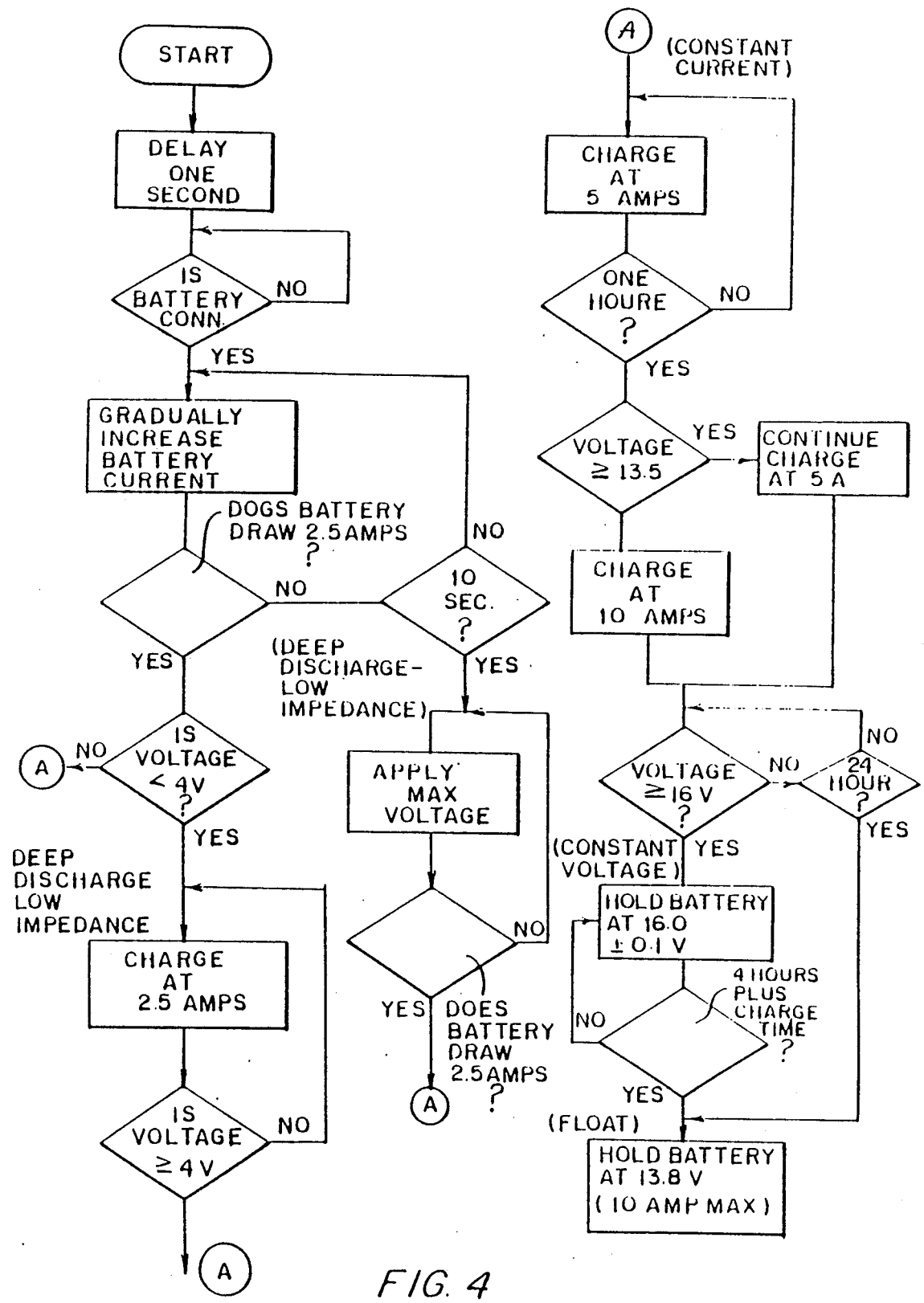

With reference to FIG. 4, the micro-processor and its associated removeable memory may be provided with a series of signals which implement a particular logic sequence related to the charging characteristic for each type of battery. A logic sequence which has been found to be particularly beneficial for lead-calcium batteries, is shown in the flow chart of FIG. 4. In this logic sequence, at the start of the sequence, a one second delay is used to prevent arcing on the battery connection. Once the logic has established that the battery is connected, the micro-processor 70 can perform a deep discharge check in which the charger gradually increases the battery current to 2.5 amps over a period of ten seconds. If the battery will not draw 2.5 amps at the expiration of ten seconds, the battery is considered to be in deep discharge (high impedance) and the charger continues to apply voltage that may be constant until the battery draws more than 2.5 amps. The charger then may enter the constant current mode described immediately below.

If the battery draws 2.5 amps prior to the expiration of the ten second period, the voltage level of the battery is checked and if less than four volts the battery is treated as a deep discharge, (low impedance) and is charged at a rate of 2.5 amps until the voltage exceeds four volts. The charger then may enter the constant current mode described immediately below.

If upon initial connection the battery draws greater than 2.5 amps within ten seconds and at a voltage greater than four volts, the charger proceeds immediately to the constant current mode In the constant current mode the battery is charged at a mean current of five amps for a period of one hour at which point the voltage is measured and if greater than 13.5 volts the charge is continued at five amps and otherwise continued at ten amps mean (15 amps RMS). In either case, the charge is continued at the indicated rate until the voltage exceeds 16 volts or until the passage of 24 hours. After a period of 24 hours passes, the charger goes into a float mode sequence in which the battery is held at 13.8 volts with a current limit of ten amps until the charger is switched off or battery is disconnected. If the voltage measurements achieves 16 volts within a 24 hour period, the battery is then held at 16 volts for a period of time equal to time of the charge plus four hours in a constant voltage mode.

On the expiration of the constant voltage mode, the battery is held in the float mode until the charger is switched off or the battery is disconnected.

Figure 5:
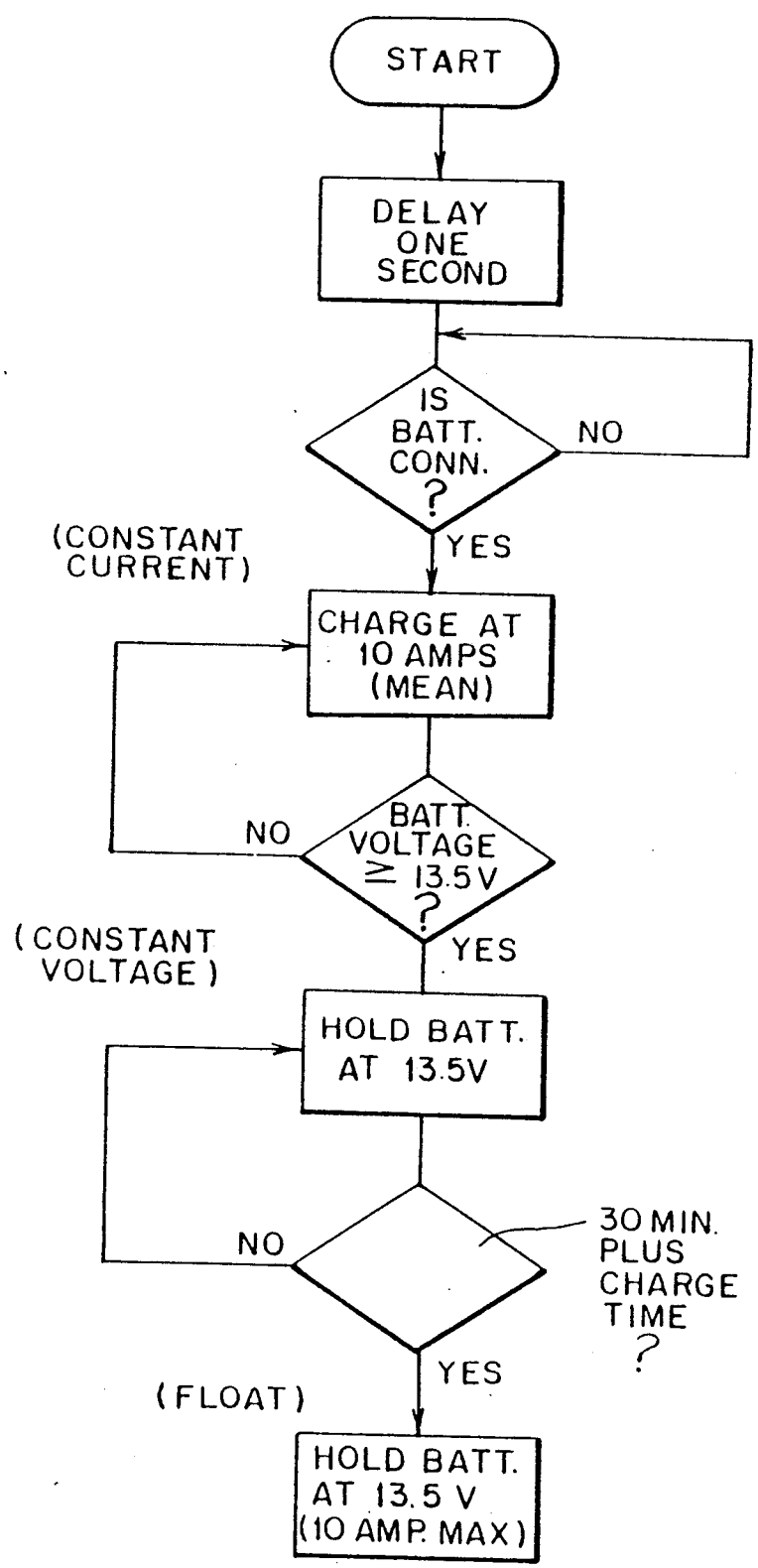
Figure 6:
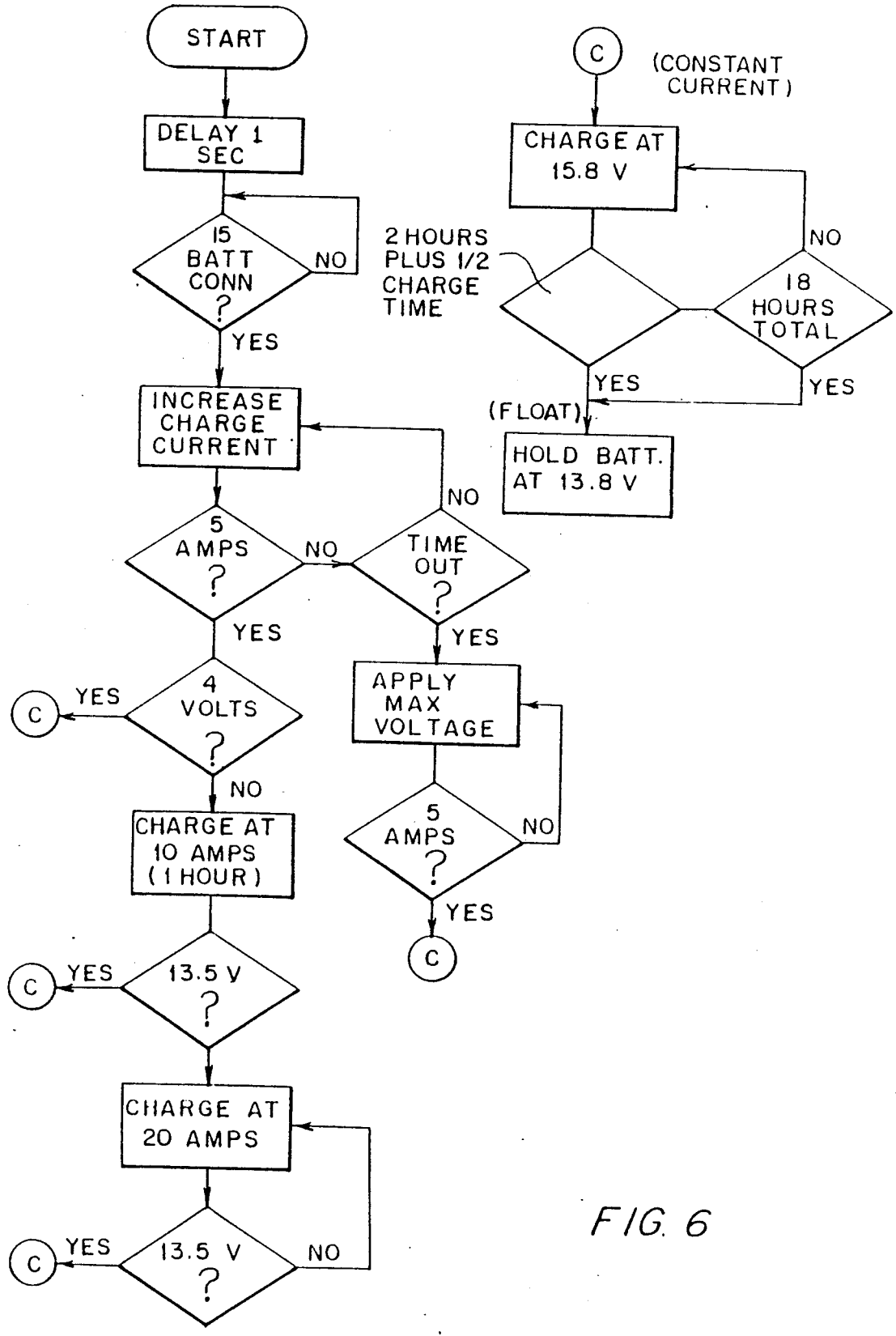

With reference to FIG. 5, the battery charger circuit may also follow any other logic sequence to achieve a desired charging characteristic, the logic sequence indicated in the flow chart of FIG. 5 has been found to be particularly advantageous for nickel/zinc batteries. In this logic sequence, the micro-processor delays one second to prevent arcing on battery connection and may wait until a signal is obtained indicating that the battery is connected to the charging circuit. Once the battery is connected, the battery may be changed at ten amps (mean) until the battery voltage increases to 13.5 volts. When the battery voltage exceeds 13.5 volts, the charging circuit may enter a constant voltage phase in which the battery is held at 13.5 volts for a period of time equal to 30 minutes plus the amount of time taken during the constant current phase. The constant voltage phase is limited to a total of 18 hours after the battery has been connected to the supply.

Upon completion of the constant voltage phase, the charger executes a float mode in which the battery is held at 13.5 volts with a limit of 10 amps of current. The battery is held in the float until the battery charger is switched off or the battery is disconnected.

With reference to FIG. 6, a logic sequence is presented in the flow chart which has been found particularly advantageous for sealed lead-calcium batteries and similar closed cell batteries. In the logic sequence, the battery charger may delay one second and insure that the battery is connected before energizing the recharging circuitry. The charging current may be increased gradually to five amps over a predetermined period. If the battery will not draw five amps within that period, maximum voltage is applied to the battery terminals until five amps is achieved at which point the charging cycle enters the constant current mode.

With continued reference to FIG. 6, if the battery draws five amps upon initial testing, then the battery may be checked to determine whether the voltage is greater than four volts. If the voltage exceeds four volts the battery charging circuit can enter the constant current mode, described below. Otherwise, the battery is charged at ten amps for one hour and if not yet reaching 13.5 volts then the battery is then charged at 20 amps until 13.5 volts is achieved.

In the constant current mode, the battery is charged at a variable voltage $V_1$ for a period of time equal to two hours plus one-half the previous charge time with a maximum of 18 hours between initial battery connection and the end of the constant current mode. Once the battery charge circuit exits the constant current mode, it enters a float mode in which the battery is held at 13.8 volts with a maximum of ten amps. The battery charging circuit remains in this float mode until switched off or until the battery disconnected.

Finally, a specific apparatus has been described for performing the method of this invention. A great many obvious variations of this apparatus will be readily apparent which correspond generally to the alternative methods described. The invention is claimed in the following claims which are to be accorded a full range of equivalents.

What is claimed is:

1. In a battery charging system comprising a battery having a maximum voltage and a means for supplying current to the battery, a method of charging a battery comprising the steps of:
    electrically connecting said battery to said current supply means;
    gradually increasing the current supplied to the battery to a predetermined current check point or until a predetermined time point which ever occurs earlier;
    measuring the voltage across the battery when the current is at said current check point to provide a voltage test reading;
    operating said current supply means responsively to said voltage test reading.

2. The method of claim 1 wherein said step of operating said current supply means comprises applying a voltage $V_1$ to the battery until the battery current reaches said predetermined current check point unless said predetermined time point occurs earlier.

3. The method of claim 1 wherein said steps of operating said current supply means comprises applying a first predetermined constant current to the battery until the voltage test reading exceeds a predetermined voltage check point.

4. The method of claim 2, wherein said step of operating said current supply means further comprises the steps of:
    applying a second predetermined constant current for a first period of time;
    measuring the voltage across the battery to provide a second voltage test reading;
    if the second voltage test reading exceeds a first predetermined level, continuing to apply said second constant current until the voltage reaches said second predetermined level,
    if the second voltage test reading is less than or equal to the first predetermined level, applying a third predetermined constant current until the voltage reaches said second predetermined level.

5. The method of claim 4 wherein said step of operating said current supply means further comprises:
    applying a constant voltage at a third predetermined level for a duration of time related to the duration of time utilized to charge the battery to said third predetermined level.

6. A method of charging relatively recently sulfated batteries comprising, in the order indicated, the steps of:
    (a) applying a constant voltage across the terminals of a battery until the charging current reaches a first predetermined current level;
    (b) varying the voltage supplied to the charging circuit to provide a constant, predetermined, charging current;
    (c) measuring the voltage across the battery after a predetermined period of time; and (d) provided a second predetermined charging current if the measured voltage is less than a predetermined voltage level.

7. The method of claim 3, wherein said step of operating said current supply means further comprises the steps of:

applying a second predetermined constant current for a first period of time;

measuring the voltage across the battery to provide a second voltage test reading;

if the second voltage test reading exceeds a first predetermined level, continuing to apply said second constant current until the voltage reaches a second predetermined level, if the second voltage test reading is less than or equal to the first predetermined level, applying a third predetermined constant current until the voltage reaches said second predetermined level.

8. A method of charging a battery comprising, in the order indicated, the steps of:

(a) applying a charging current to the battery to determine whether the battery will draw a first predetermined current within a first predetermined time period;

(b) if the battery draws said first current within said first time period, applying a second constant predetermined current to the battery until the voltage across the battery reaches a first predetermined voltage level;

(c) if the battery does not draw said first current within said first time period, applying a constant voltage across the battery until the battery's charging current reaches a third predetermined current;

(d) providing a fourth constant predetermined current to the battery;

(e) measuring the voltage across the battery after a second predetermined time period; and (f) providing a fifth predetermined current to the battery if the measured voltage is less than a second predetermined voltage level.

* * * * *